US010910005B1

(12) United States Patent
Teo et al.

(10) Patent No.: US 10,910,005 B1
(45) Date of Patent: Feb. 2, 2021

(54) TANGENTIAL AND LONGITUDINAL GLIDE RAMP FOR MAGNETIC STORAGE DEVICE

(71) Applicant: Western Digital Technologies, Inc., San Jose, CA (US)

(72) Inventors: Kia Moh Teo, San Jose, CA (US); Biao Sun, Fremont, CA (US); Weidong Huang, Palo Alto, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/823,185

(22) Filed: Mar. 18, 2020

(51) Int. Cl.
G11B 5/54 (2006.01)
G11B 5/48 (2006.01)

(52) U.S. Cl.
CPC .............. G11B 5/54 (2013.01); G11B 5/4826 (2013.01)

(58) Field of Classification Search
None
See application file for complete search history.

(56) References Cited

U.S. PATENT DOCUMENTS

| 6,151,197 | A | 11/2000 | Larson et al. |
| 7,301,730 | B2 | 11/2007 | Lee et al. |
| 7,477,488 | B1 | 1/2009 | Zhang et al. |
| 7,609,483 | B2 | 10/2009 | Deguchl et al. |
| 7,724,476 | B1 | 5/2010 | Bjorstrom et al. |
| 8,105,705 | B2 | 1/2012 | Bai et al. |
| 9,536,552 | B1 * | 1/2017 | Chen .................. G11B 21/22 |
| 2005/0237670 | A1 | 10/2005 | Fujimoto et al. |
| 2006/0012919 | A1 | 1/2006 | Choi et al. |
| 2009/0251824 | A1 * | 10/2009 | Heo ..................... G11B 21/22 360/244 |
| 2014/0268426 | A1 | 9/2014 | Hardy et al. |

(Continued)

FOREIGN PATENT DOCUMENTS

| EP | 1555654 | 7/2005 |
| JP | 11306704 | 11/1999 |
| JP | 2000076811 | 3/2000 |

(Continued)

OTHER PUBLICATIONS

International Search Report and Written Opinion concerning International Application No. PCT/US2020/026121 dated Sep. 11, 2020.

(Continued)

Primary Examiner — William J Klimowicz
(74) Attorney, Agent, or Firm — Kunzler Bean & Adamson

(57) ABSTRACT

Disclosed here is a ramp for receiving a lift tab of a hard disk drive. The ramp comprises a first side and a second side, where the first side is spaced apart from the second side. The ramp also comprises an inclined surface along which the lift tab slides as it moves in a first direction to remove a read/write head from a disk of the hard disk drive. The inclined surface inclines from a leading edge of the ramp to an intermediate edge of the ramp in the first direction. The inclined surface has a width that is generally perpendicular to the first direction and extends from the first side to the second side. The inclined surface has a width that is generally perpendicular to the first direction and extends from the first side to the second side. The tapered portion defines an oblique angle relative to the first direction.

20 Claims, 5 Drawing Sheets

(56) References Cited

U.S. PATENT DOCUMENTS

2017/0309303 A1   10/2017   Aoki et al.

FOREIGN PATENT DOCUMENTS

| JP | 2001101814 | | 4/2001 | |
|---|---|---|---|---|
| JP | 2010146686 A | * | 7/2010 | ............. G11B 21/22 |
| KR | 20030068233 | | 8/2003 | |
| KR | 100757291 | | 9/2007 | |

OTHER PUBLICATIONS

Yoon et al., Operational Shock Analysis for 2.5-in Multi-Disk HDD Considering Ramp-Disk Gap Irregularity, IEEE Transactions on Magnetics, Mar. 2017, pp. 1-4, vol. 53, No. 3.
U.S. Appl. No. 16/716,115, filed Dec. 16, 2019.

* cited by examiner

TANGENTIAL AND LONGITUDINAL GLIDE RAMP FOR MAGNETIC STORAGE DEVICE

FIELD

This disclosure relates generally to magnetic storage devices, and more particularly to a tangential and longitudinal glide ramp for a magnetic storage device.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Storage capacity is limited by the area available and the area density capability of the storage elements of the HDD.

SUMMARY

A need exists for a magnetic storage device with a tangential and longitudinal glide ramp. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed here is a ramp for receiving a lift tab of a hard disk drive. The ramp comprises a first side and a second side. The first side is spaced apart from the second side. The ramp also comprises an inclined surface along which the lift tab slides as it moves in a first direction to remove a read/write head from a disk of the hard disk drive. The inclined surface inclines from a leading edge of the ramp to an intermediate edge of the ramp in the first direction. The inclined surface has a width that is generally perpendicular to the first direction and extends from the first side to the second side. The inclined surface has a width that is generally perpendicular to the first direction and extends from the first side to the second side. The tapered portion defines an oblique angle relative to the first direction. The preceding subject matter of this paragraph characterizes example 1 of the present disclosure.

The tapered portion extends continuously from the first side to the second side. The preceding subject matter of this paragraph characterizes example 2 of the present disclosure, wherein example 2 also includes the subject matter according to example 1, above.

The tapered portion extends continuously from the first side to an intermediate point located between the first side and the second side. The preceding subject matter of this paragraph characterizes example 3 of the present disclosure, wherein example 3 also includes the subject matter according to any one of examples 1-2, above.

The oblique angle defined by the tapered portion relative to the first direction is less than 90 degrees. The preceding subject matter of this paragraph characterizes example 4 of the present disclosure, wherein example 4 also includes the subject matter according to any one of examples 1-3, above.

The oblique angle defined by the tapered portion relative to the first direction is within a range of 25-65 degrees. The preceding subject matter of this paragraph characterizes example 5 of the present disclosure, wherein example 5 also includes the subject matter according to example 4, above.

The oblique angle defined by the tapered portion relative to the first direction is 45 degrees. The preceding subject matter of this paragraph characterizes example 6 of the present disclosure, wherein example 6 also includes the subject matter according to example 5, above.

An angle of incline of the inclined surface is within a range of 16-20 degrees. The preceding subject matter of this paragraph characterizes example 7 of the present disclosure, wherein example 7 also includes the subject matter according to any one of examples 1-6, above.

The first side is shorter than the second side by a length within a range of 0.10-0.50 mm. The preceding subject matter of this paragraph characterizes example 8 of the present disclosure, wherein example 8 also includes the subject matter according to any one of examples 1-7, above.

The first side is shorter than the second side by a length of 0.30 mm. The preceding subject matter of this paragraph characterizes example 9 of the present disclosure, wherein example 9 also includes the subject matter according to example 8, above.

Further disclosed herein is a hard drive. The hard drive comprises a plurality of disks. The hard drive also comprises a plurality of lift tabs. Each lift tab comprises an elongate member that is coupled to an actuator arm of a plurality of actuator arms. Each actuator arm is pivotably connected to a pivot post and comprises a read/write head for reading and writing data from/to a corresponding disk of the plurality of disks when the actuator arm is in a load position. The hard drive further comprises a ramp structure comprising a plurality of ramps, each ramp corresponding to a disk of the plurality of disks and comprising a first side and a second side. The first side is spaced apart from the second side and an inclined surface along which each lift tab slides as it moves in a first direction to remove the read/write head from a disk of the plurality of disks. The inclined surface inclines from a leading edge of the ramp to an intermediate edge of the ramp in the first direction. The inclined surface has a width, generally perpendicular to the first direction and extends from the first side to the second side. The leading edge comprises a tapered portion that extends from the first side toward the second side of the ramp. The tapered portion defines an oblique angle relative to the first direction. The preceding subject matter of this paragraph characterizes example 10 of the present disclosure.

The lift tab, while moving in the first direction to remove the read/write head from the disk, contacts the ramp at a first point on the tapered portion and slides along an edge of the tapered portion of the leading edge to a second point where the tapered portion and the first side intersect. The lift tab slides on an edge of the inclined surface along the second side in the first direction towards the intermediate edge of the ramp. The preceding subject matter of this paragraph characterizes example 11 of the present disclosure, wherein example 11 also includes the subject matter according to example 10, above.

The lift tab travels a radial distance within a range of 0.15-0.35 mm while sliding along the tapered portion of the ramp. The preceding subject matter of this paragraph characterizes example 12 of the present disclosure, wherein example 12 also includes the subject matter according to example 11, above.

The lift tab travels a radial distance of 0.25 mm while sliding along the tapered portion of the ramp. The preceding subject matter of this paragraph characterizes example 13 of the present disclosure, wherein example 13 also includes the subject matter according to example 12, above.

The lift tab slides a linear distance along the tapered portion of the ramp within a range of 0.75-1.00 mm. The preceding subject matter of this paragraph characterizes example 14 of the present disclosure, wherein example 14 also includes the subject matter according to any one of examples 11-13, above.

The lift tab slides a linear distance along the tapered portion of the ramp of 0.88 mm. The preceding subject matter of this paragraph characterizes example 15 of the present disclosure, wherein example 15 also includes the subject matter according to example 14, above.

An amount of radial distance that the lift tab travels and an amount of linear distance the lift tab slides along the tapered portion is determined as a function of the oblique angle defined by the tapered portion relative to the first direction. The preceding subject matter of this paragraph characterizes example 16 of the present disclosure, wherein example 16 also includes the subject matter according to any one of examples 11-15, above.

The tapered portion of each ramp of the plurality of ramps that extends from the first side toward the second side of the ramp is tangential to an outer edge of a corresponding disk of the plurality of disks. The preceding subject matter of this paragraph characterizes example 17 of the present disclosure, wherein example 17 also includes the subject matter according to any one of examples 10-16, above.

Each ramp of the plurality of ramps is offset a distance from a corresponding disk of the plurality of disks such that the ramp does not overlap the disk. The preceding subject matter of this paragraph characterizes example 18 of the present disclosure, wherein example 18 also includes the subject matter according to any one of examples 10-17, above.

Additionally disclosed herein is a method of loading and unloading a read/write head from a disk using a ramp. The method comprise the step of actuating an actuator arm pivotably connected to a pivot post in a first direction. The actuator arm comprises the read/write head and a lift tab. The read/write head is configured to read and write data from/to the disk when the actuator arm is in a load position. The lift tab comprises an elongate member that is configured to engage the ramp to remove the read/write head from the disk while the actuator arm moves in the first direction. The ramp comprises a first side and a second side, where the first side is spaced apart from the second side. The ramp also comprises an inclined surface along which the lift tab slides as it moves in the first direction to remove the read/write head from the disk. The inclined surface inclines from a leading edge of the ramp to an intermediate edge of the ramp in the first direction and the inclined surface has a width, generally perpendicular to the first direction and extending from the first side to the second side. The leading edge comprises a tapered portion extending from the first side toward the second side of the ramp. The tapered portion defines an oblique angle relative to the first direction. The method also comprises the step of contacting a first point of the ramp with the lift tab while the lift tab moves in the first direction. The first point of the ramp comprises a point on the tapered portion of the leading edge. The lift tab slides along an edge of the tapered portion from the first point toward a second point. The method additionally comprises the step of contacting the second point of the ramp with the lift tab while the lift tab continues to move in the first direction, the second point comprising a point where the tapered portion and the first side intersect. The lift tab slides on an edge of the inclined surface along the first side in the first direction towards the intermediate edge of the ramp. The preceding subject matter of this paragraph characterizes example 19 of the present disclosure.

The method further comprises the step of actuating the actuator arm in a second direction opposite the first direction, to remove the lift tab from the ramp and load the read/write head onto the disk. The method also comprises the step of contacting the second point of the ramp with the lift tab while the lift tab moves in the second direction. The lift tab slides on the edge of the inclined surface along the first side in the second direction towards the first point. The method additionally comprises the step of contacting the first point of the ramp with the lift tab while the lift tab continues to move in the second direction. The lift tab slides along the edge of the tapered portion from the second point toward the first point. The lift tab is removed from the ramp at the first point. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
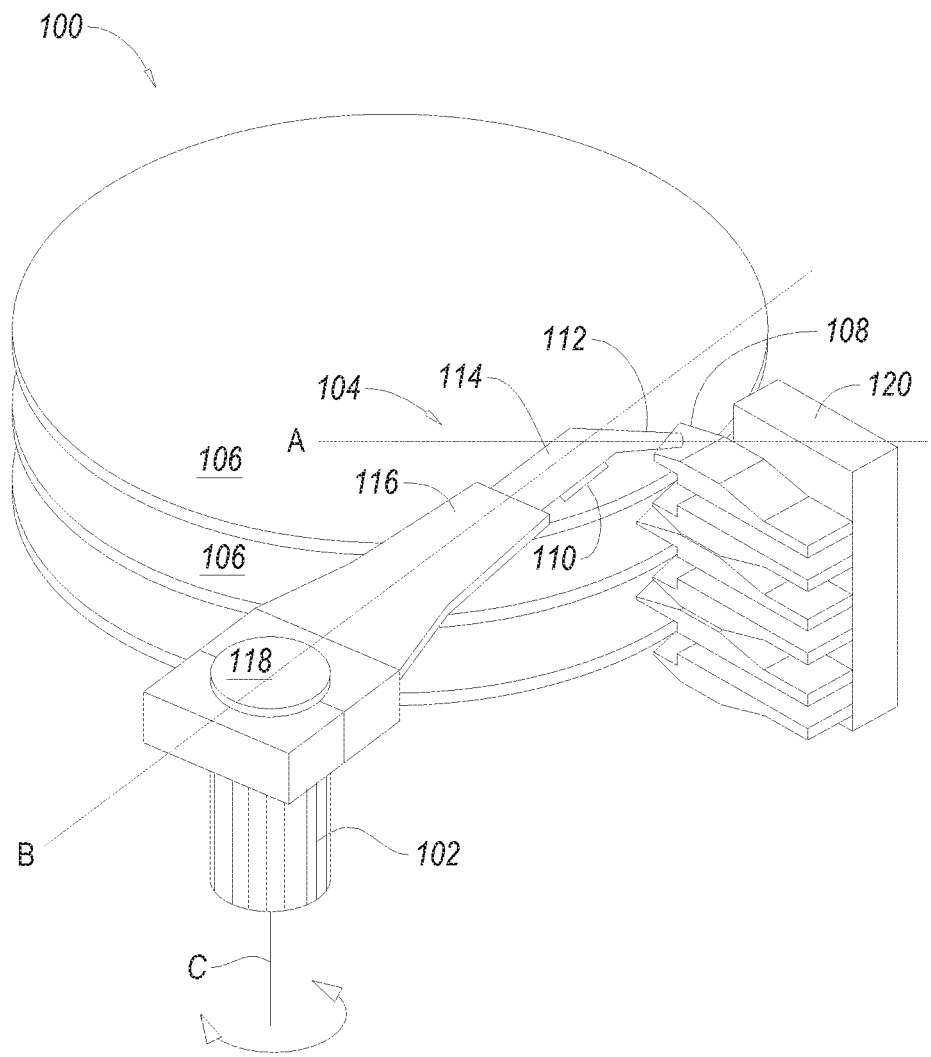
FIG. 1 is a perspective view of a magnetic storage device, according to one or more examples of the present disclosure.

Referring to FIG. 1, a magnetic storage device 100 (e.g., magnetic recording device), according to one embodiment, is depicted as a hard disk drive ("HDD"). However, in other embodiments, the magnetic storage device 100 can be any of various magnetic storage devices without departing from the essence of the subject matter of the present disclosure. FIG. 1, in certain embodiments, shows at least a portion of the internal components of a load/unload type of magnetic storage device 100. As used herein, a load/unload type magnetic storage device 100 includes an actuator arm 116 that includes a read/write head for reading and/or writing data from/to the disk 106 by loading the read/write head on the disk 106 to perform read/write operations and unloading the read/write head from the disk 106 and onto a ramp 108 such that the read/write head does not sit on the disk 106 when not in use.

The magnetic storage device 100, in one embodiment, includes a rotary actuator 102 for actuating a pivot post 118. The magnetic storage device 100 includes magnetic data storage disks 106 and a load/unload ramp 108. The magnetic disk 106 has a surface capable of storing magnetically stored data that can be read by a read/write head. The load/unload ramp 108 provides for loading and unloading of the read/write head from the magnetic disks 106. The details of the ramp 108 will be discussed below with reference to FIGS. 3A-4B. The rotary actuator 102 rotates the head gimbal assembly 104 about the pivot post 118 along axis C. The head gimbal assembly 104 is aligned so that the lift tab 112 contacts the ramp 108 when the rotary actuator 102 rotates the head gimbal assembly 104 to its outermost position.

In one embodiment, an actuator arm 116 supports and/or is coupled with a suspension assembly 114, which is attached to a distal end of the actuator arm 116 and extends forward from the actuator arm 116. According to some examples, the suspension assembly 114 is made of stainless steel and uses a gimbal spring (not shown) to cantilever the slider/head 110 and a lift tab 112 at the distal end of the suspension assembly 114. A magnetic read/write head (not shown) is located on a bottom surface of the slider 110. In one embodiment, at least a portion of the actuator arm 116, the suspension assembly 114, the slider 110, the read/write head, and the lift tab 112 comprise a head gimbal assembly 104. The actuator arm 116 and the suspension assembly 114 may comprise a single, monolithic unit such that the suspension assembly 114 is not separate from the actuator arm 116.

The suspension assembly 114, in one embodiment, supports a wiring part connected to the slider 110 through a lead, etc. The wiring part is small and omitted in FIG. 1. The sense current, read-in data, and read-out data are supplied and output between the read/write head and the wiring part through such a lead. The suspension assembly 114 applies an elastic force to the slider 110 and the lift tab 112 against the surface of the magnetic disk 106.

The lift tab 112 is positioned on the actuator arm 116 and/or suspension assembly 114 so that it engages a ramp 108 on a ramp structure 120. The ramp 108 has a sloped or inclined surface that imparts an upward force on the lift tab 112, which lifts the slider 110 and the magnetic read/write head away from the disk 106. The magnetic read/write head is thereby not in contact with the disk 106 when the lift tab 112 is moved onto the ramp 108, e.g., is in an unload state, position, or location. For the lift tab 112 to lift the slider 110 from the disk 106, the lift tab 112 rubs or slides against a sloped or inclined surface of the ramp 108 when the actuator arm 116 is moved into an unload position. The ramp structure 120 may include multiple ramps 108 that correspond to multiple different actuator arms 116. For instance, each disk 106 may have at least two corresponding actuator arms 116 for positioning read/write heads on both surfaces of the disk 106.

The lift tab 112 extends along a linear axis A to serve as an engagement part with the ramp 108. In one embodiment, the lift tab 112 is integrated with the actuator arm 116 and/or the suspension assembly 114 and is made of the same material as that of the actuator arm 116 and/or the suspension assembly 114. The lift tab 112 slides on the ramp 108 and serves to load and unload the slider 110. In other words, the lift tab 112 loads the slider 110 from the ramp 108 over the magnetic disk 106 after driving of the magnetic disk 106 starts, and unloads the slider 110 from the magnetic disk 106 to the ramp 108, so as to hold the slider 110 on the ramp 108, before driving of the magnetic disk 106 stops. The ramp 108 and the ramp structure 120, in certain embodiments, are made from low-friction polymer materials. The ramp 108 is discussed in more detail below with reference to FIGS. 3A-4B.

Figure 2:
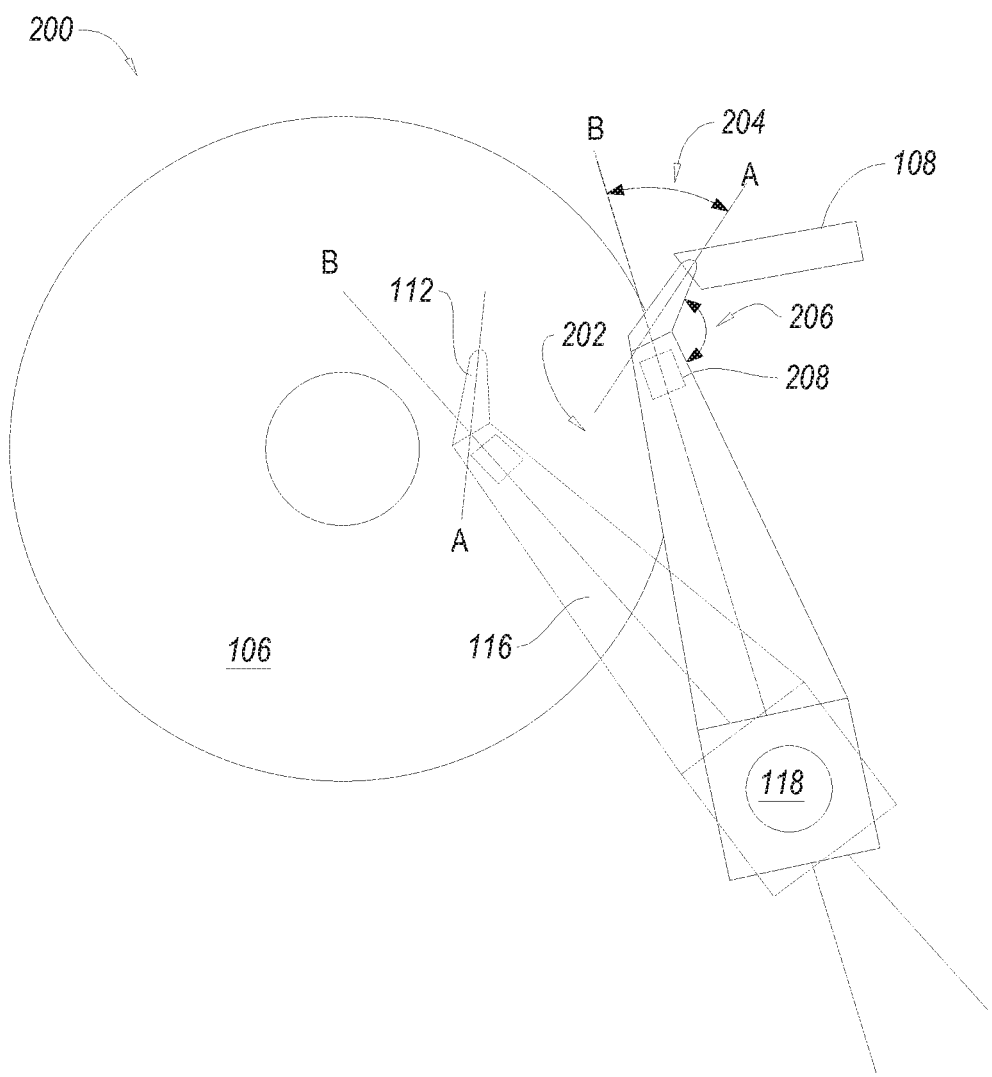
FIG. 2 is a top plan view of components of a magnetic storage device, according to one or more examples of the present disclosure.

FIG. 2 is a view of a magnetic storage device 200, according to one or more examples of the present disclosure. In one embodiment, the magnetic storage device 200 illustrated in FIG. 2 is substantially similar to the magnetic storage device 100 illustrated in FIG. 1.

In one embodiment, the magnetic storage device 200 includes a head gimbal assembly 104 that includes an actuator arm 116 that is coupled to a pivot post 118. The actuator arm 116 includes a read/write head 208, located on a side of the actuator arm 116 that faces the disk 106, for reading and/or writing data from/to the disk 106. The actuator arm 116 includes a lift tab 112 that is configured to engage a ramp 108 when the actuator arm 116 is in an unload position. As used herein, the unload position is a position where the read/write head 208 does not sit on the disk 106 and is not being used for reading data and/or writing data from/to the disk 106.

The actuator arm 116 is configured to radially pivot about the pivot post 118, by means of an actuator 102, along a radial axis 202 between a load position and the unload position. As used herein, the load position is a position where the read/write head 208 sits on the disk 106 to read/write data from/to the disk 106. Furthermore, when the actuator arm 116 is in the unload position, where the lift tab 112 engages the ramp 108, the read/write head 208 overlaps at least a portion of the disk 106 in a direction perpendicular to the axis B along which the actuator arm 116 extends.

Due to the shape and configuration of the lift tab 112, the ramp 108 is offset from the disk 106 by a certain distance so that the ramp 108 does not overlap the disk 106, which allows the read/write head 208 to service closer to the outer dimension, edge, circumference of the disk 106 for reading and storing data. Furthermore, because the ramp 108 does not overlap the disk 106, the reliability of the disk 106 is increased because debris and dust that may be created by repeated engagement of the lift tab 112 with the ramp 108 does not fall onto the disk 106. Similarly, the shock reliability of the magnetic storage device 200 can also be improved because shock contacts between the disk 106 and the ramp 108 can be eliminated. In some embodiments, the distance that the ramp 108 is offset or set back from the disk 106 is within a range between 0.1 mm and 0.5 mm, such as, for example, 0.3 mm. In such an embodiment, the length of the elongate member 402 of the lift tab 112 is greater than the distance of the ramp 108 from the disk 106.

The lift tab 112 is an elongate member that extends linearly along an axis A that intersects or crosses with the linear axis B that the actuator arm 116 extends along. In such an embodiment, the intersection of the axes A, B forms an outer angle 204 between the axis A, B and an inner angle 206 between the lift tab 112 and the actuator arm 116 where the lift tab 112 angles away from the actuator arm 116 such that the elongate member of the lift tab 112 is between the ramp 108 and the actuator arm 116. The distal end of the elongate member engages the ramp 108 to lift the read/write head 208 off the disk surface while it is not used for reading and/or writing data.

In one embodiment, the angle 206 defined between the lift tab 112 and the actuator arm 116 is between 90 degrees and 170 degrees. In certain embodiments, the angle 206 defined between the lift tab 112 and the actuator arm 116 is within a range of 120-150 degrees. In some embodiments, the angle 206 defined between the lift tab 112 and the actuator arm 116 is 135 degrees. In one embodiment, the outer angle 204, opposite the inner angle 206, defined between the linear axes A, B is between 10 and 90 degrees. In further embodiments, the outer angle 204 defined between the linear axes A, B is between 30 and 70 degrees. In some embodiments, the outer angle 204 defined between the linear axis A and the linear axis B is 45 degrees. As used herein, an angle defined between two features is an angle greater than, and not including, 0 degrees and less than, and not including, 360 degrees.

In one embodiment, the distal end of the elongate member of the lift tab 112 is offset from the linear axis B by a predetermined length along the axis A within a range between 2 mm and 4 mm. In certain embodiments, a ratio of an entire length of the actuator arm 116 to an entire length of the elongate member of the lift tab 112 is within a range between 0.04 and 0.15. In one embodiment, the ratio of the entire length of the actuator arm 116 to the entire length of the elongate member of the lift tab 112 is 0.06.

In certain embodiments, the magnetic storage device 200 includes multiple storage disks 106, as shown in FIG. 1, with multiple corresponding gimbal head assemblies 104. In such an embodiment, the disks 106 may be stacked or located adjacent to one another. Gimbal head assemblies 104 that include actuator arms 116 with read/write heads 208 may be located above and below a disk 106 to read/write data from/to both surfaces of the disk 106. Thus, in between disks 106, actuator arms 116 may be located back-to-back, with one reading a surface of a first disk 106 and the other reading an opposing surface of a second disk 106.

In such an embodiment, the ramp structure 120 may include multiple ramps 108 for engaging the lift tab 112 of each actuator arm 116 when the read/write heads 208 are not being used to read/write data. Accordingly, the actuator arms 116 between disks 106 that are located back-to-back may have a certain amount of clearance between them when the lift tab 112 for each actuator arm 116 engages the corresponding ramp 108 when the actuator arms 116 are in an unload position. The range of the clearance between the actuator arms 116 that are located between disks 106 may be within a range of 0.05 mm-1 mm. The clearance, in one embodiment, between the actuator arms 116 that are located between disks 106 is 0.525 mm.

Figure 3A:
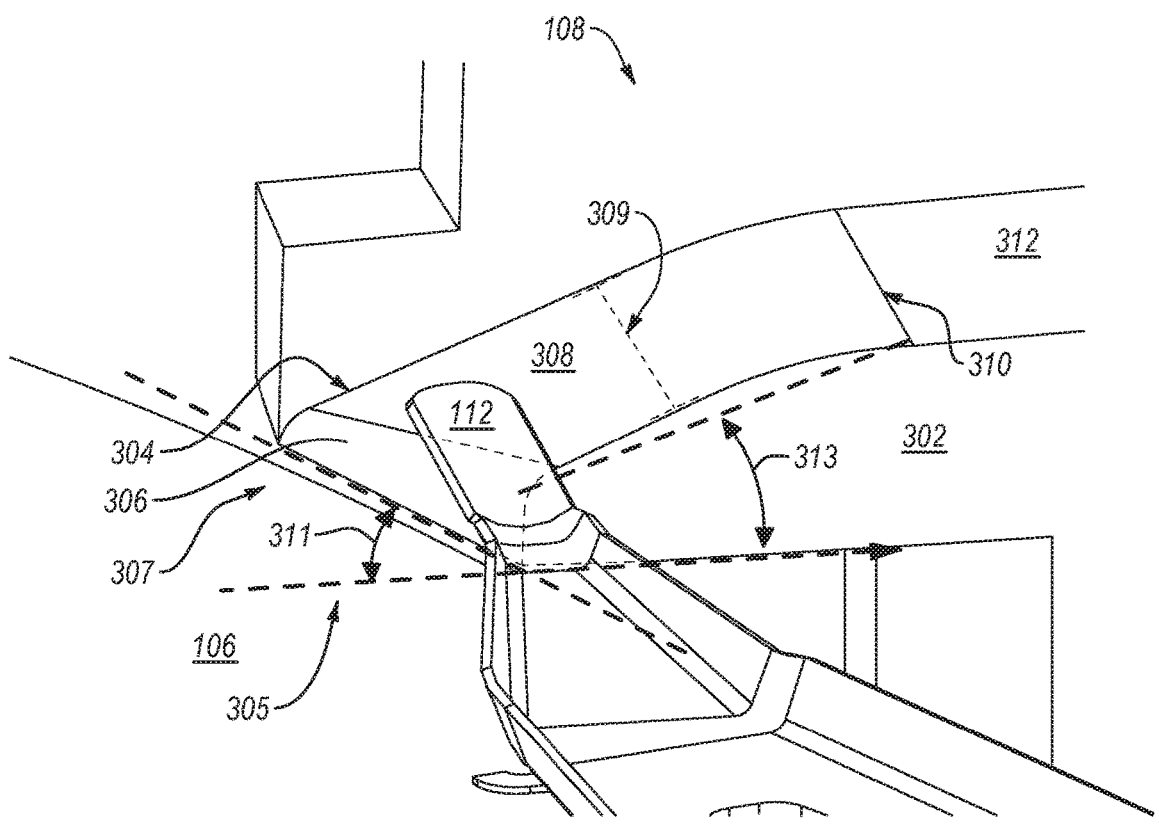
FIG. 3A is a perspective view of ramp, according to one or more examples of the present disclosure.

FIG. 3A is a perspective view of a ramp 108 according to the subject matter disclosed herein. The ramp 108 includes a first side 302 and a second side 304 that is spaced apart from the first side by a width 309. The ramp 108 includes an inclined surface 308 along which the lift tab 112 slides as it moves in a first direction 305 to remove a read/write head from the disk 106.

In one embodiment, the inclined surface 308 inclines from a leading edge 307 of the ramp 108 to an intermediate edge 310 of the ramp in the first direction 305. In certain embodiments, the inclined surface 308 extends the full length of the ramp 108, from the leading edge 307 to a trailing edge (not shown) of the ramp 108, without an intermediate edge 310 in between.

The inclined surface 308 has a width 309 that is generally perpendicular to the first direction 305 and extends from the first side 302 to the second side 304. The leading edge 307 includes a tapered portion 306 that extends from the first side 302 towards the second side 304 of the ramp 108. The tapered portion 306 defines an oblique angle 311 relative to the first direction 305.

Figure 3B:
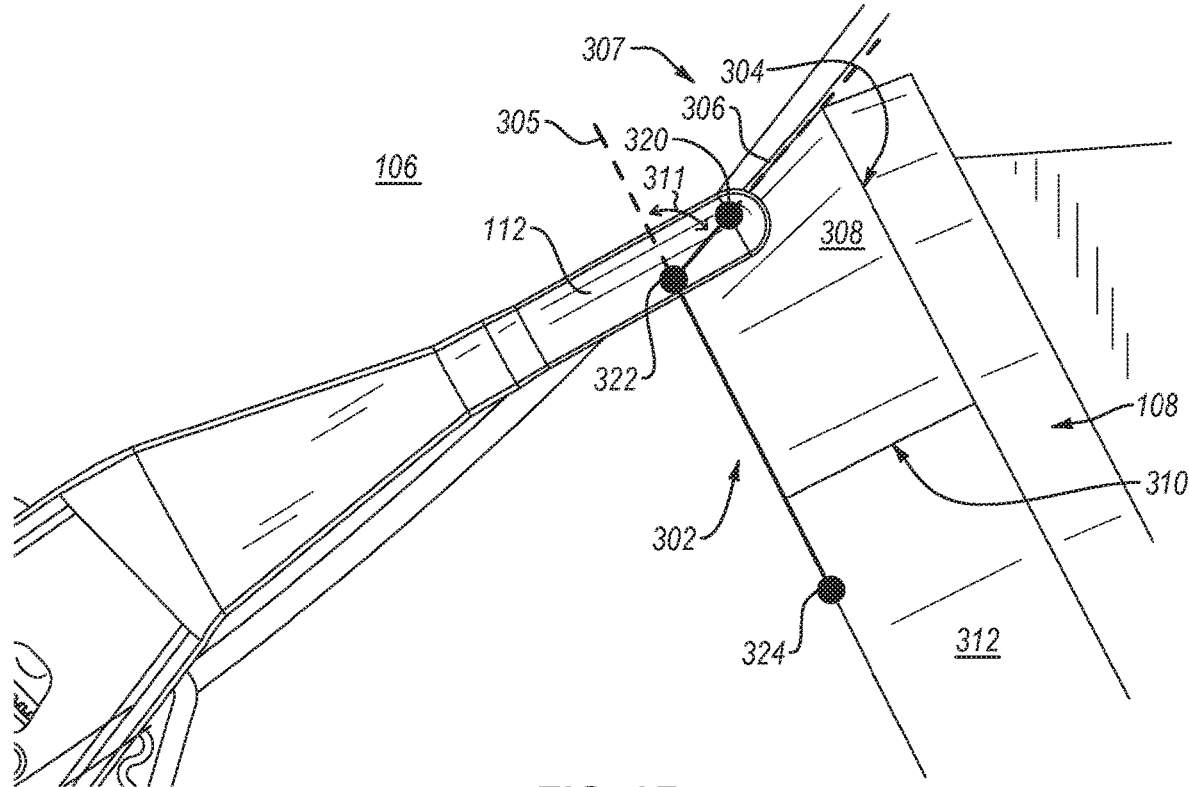
FIG. 3B is a top plan view of the ramp of FIG. 3A, according to one or more examples of the present disclosure.
Figure 4A:
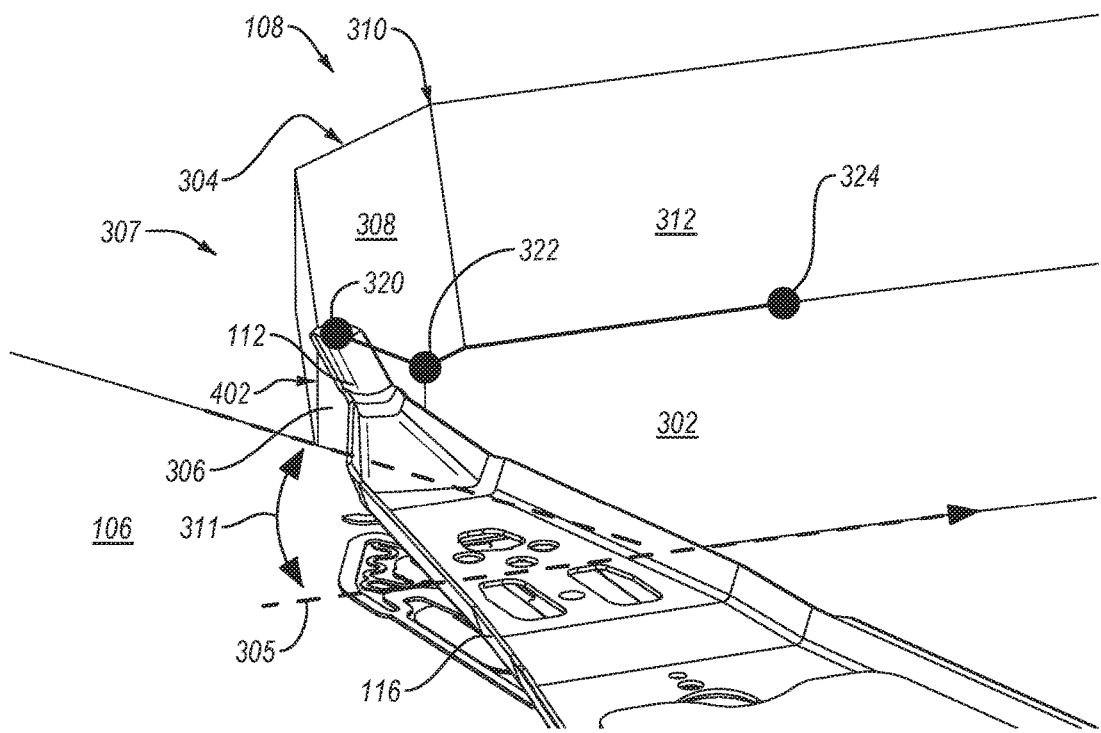
FIG. 4A is a perspective view of a ramp, according to one or more examples of the present disclosure.
Figure 4B:
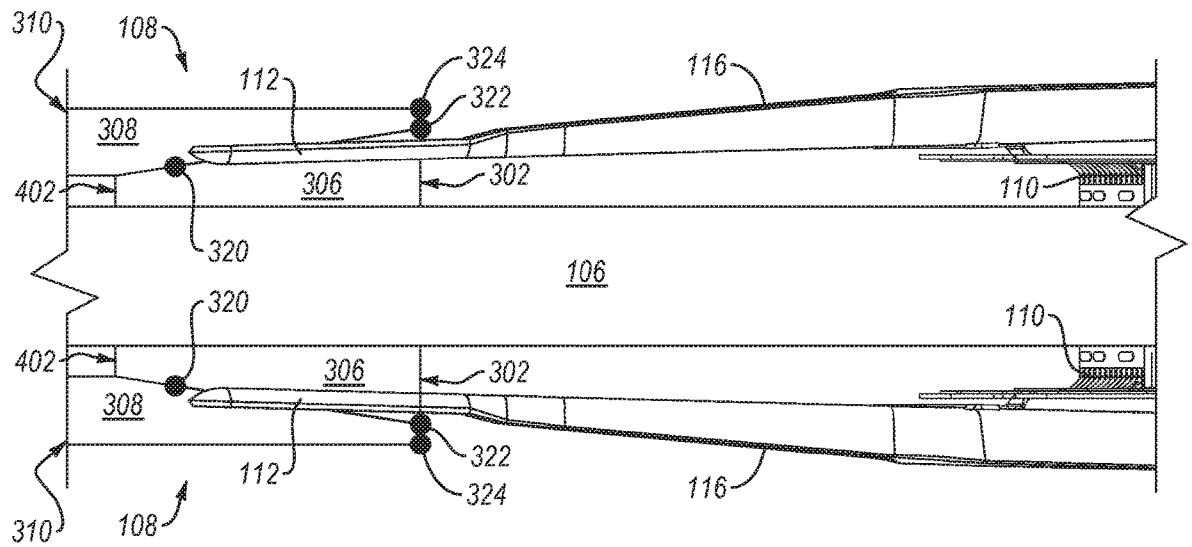
FIG. 4B is a side elevation view of the ramp of FIG. 4A, according to one or more examples of the present disclosure.

In one embodiment, the tapered portion 306 of the leading edge 307 extends continuously from the first side 302 to the second side 304, as illustrated in FIGS. 3A and 3B. In alternative embodiments, as shown in FIGS. 4A and 4B, the tapered portion 306 extends continuously from the first side 302 to an intermediate point 402 located between the first side 302 and the second side 304.

In one embodiment, the oblique angle 311 defined by the tapered portion 306 relative to the first direction 305 is less than 90 degrees. In certain embodiments, the oblique angle 311 defined by the tapered portion 306 relative to the first direction 305 is within a range of between 25 degrees and 65 degrees. In various embodiments, the oblique angle 311 defined by the tapered portion 306 relative to the first direction 305 is 45 degrees.

In one embodiment, an angle of incline 313 of the inclined surface 308 is within a range of between 16 degrees and 20 degrees. In certain embodiments, the first side 302 is shorter than the second side 304 by a length within a range of between 0.10 mm and 0.50 mm. In various embodiments, the first side 302 is shorter than the second side 304 by a length of 0.30 mm.

FIG. 3B is a top view of the ramp 108 depicted in FIG. 3A. FIG. 3B illustrates the path of the lift tab 112 as it slides from the tapered portion 306 of the leading edge 307 of the ramp up the inclined surface 308 towards the intermediate edge 310. In one embodiment, the lift tab 112 contacts the tapered portion 306 at a first point 320 along the tapered portion 306. As the lift tab 112 continues to move radially in the first direction 305 towards the ramp 108 and away from the disk 106, the lift tab 112 slides along the tapered portion 306 from the first point 320 to a second point 322 where the tapered portion 306 and the first side 302 intersect.

As the lift tab 112 continues to move radially in the first direction 305, the lift tab 112 slides along the edge of the first side 302 on the inclined surface 308 and may stop at a third point 324 along the edge of the first side 302. The third point 324 may be at a location where the ramp surface is no longer inclined and is generally flat 312.

In this manner, with a ramp 108 that includes a tapered portion 306 as illustrated in FIGS. 3A-4B, the ramp contact location on the lift tab 112 can be shifted from a distal end of the lift tab 112 and towards the proximal end of the lift tab 112 to provide more support and stiffness for the lift tab 112, especially for elongated lift tabs 112, as the lift tab 112 moves in the first direction 305. Furthermore, by shifting the ramp contact location on the lift tab 112 as the lift tab 112 moves in the first direction 305, the read/write head 110 can be unloaded from the disk 106 quicker than in conventional systems that include a ramp 108 that does not include a tapered portion 306 on its leading edge 307. Moreover, shifting the ramp contact location for the lift tab 112 can decrease the lift distance that the lift tab 112 typically travels to remove the read/write head 110 from the disk 106, which ultimately reduces the lift space necessary for each lift tab 112 included in a stack of lift tabs 112 that correspond to a stack of disks 106 and allows more room for additional disks 106 to be included in the stack.

The lift tab 112, in one embodiment, using the ramp 108 as described herein, travels a radial distance within a range of 0.15-0.35 mm while sliding along the tapered portion 306 of the ramp 108. In certain embodiments, the lift tab 112 travels a radial distance of 0.25 mm while sliding along the tapered portion 306 of the ramp 108. In one embodiment, the lift tab 112 slides a linear distance along the tapered portion 306 of the ramp 108 within a range of 0.75-1.00 mm. In certain embodiments, the lift tab 112 slides a linear distance along the tapered portion 306 of the ramp 108 of 0.88 mm.

In one embodiment, the amount of radial distance that the lift tab 112 travels and the amount of linear distance the lift tab 112 slides along the tapered portion 306 of the ramp 108 is determined as a function of the oblique angle 311 defined by the tapered portion 306 relative to the first direction 305. For instance, a larger oblique angle 311 (but less than 90 degrees in certain implementations) will cause the lift tab 112 to travel a longer linear distance along the tapered portion 306 and a shorter radial distance, whereas a smaller oblique angle 311 will cause the lift tab 112 to travel a shorter linear distance along the tapered portion 306 and a longer radial distance.

In one embodiment, the tapered portion 306 of the ramp 108 is tangential to an outer edge of a corresponding disk 106. In such an embodiment, the ramp 108 is offset a distance from the corresponding disk 106 such that the ramp 108 does not overlap the disk 106. In this manner, the entire disk can be used for data storage because the read/write head 110 can be lowered onto the disk 106 at a location generally on the outer edge of the disk 106, which conventionally would not be possible with ramps 108 that overlap an outer portion of the disk 106.

FIG. 4A is a perspective view of another embodiment of a ramp 108 and a lift tab 112, according to one or more examples of the present disclosure. In the depicted embodiment, the ramp 108 has a tapered portion 306 at the leading edge 307 of the ramp 108 that extends continuously from the first side 302 of the ramp 108 to an intermediate point/edge 402 on the leading edge 307 located between the first side 302 and the second side 304 of the ramp 108.

In such an embodiment, only a portion of the leading edge 307 of the ramp 108 comprises a tapered portion 306 instead of the tapered portion 306 running the length of the leading edge 307, as illustrated in FIGS. 3A and 3B. Furthermore, as in FIGS. 3A and 3B, the lift tab 112, as it moves in the first direction 305 towards the ramp 108, contacts the tapered portion 306 at a first point 320, slides along the tapered portion 306 to second point 322 where the tapered portion 306 and the first side 302 intersect, and slides along the edge of the first side 302 (along the inclined surface 308, past the intermediate edge 310, and along a generally flat surface 312 of the ramp 108) to a third point 324 where the lift tab 112 comes to a rest.

FIG. 4B is a perspective view of the ramp 108 of FIG. 4A, which includes a tapered portion 306 that extends from the first side 302 to an intermediate point/edge 402 on the leading edge 307 located between the first side 302 and the second side 304. FIG. 4B illustrates the lift tab 112 sliding along the tapered portion 306 towards the inclined surface 308 of the ramp 108.

The lift tab 112 contacts the inclined surface 308 at a first point 320 of the tapered portion 306 of the leading edge 307 and slides along the tapered portion 306 to a second point 322 where the tapered portion 306 and the first side 302 intersect. Notably, the contact location on the lift tab 112 shifts from a point toward the distal end of the lift tab 112 towards the proximal end of the lift tab 112, which increases the stiffness/support of the lift tab 112. The lift tab 112 continues to move toward a third point 324 along the edge of the first side 302 where the lift tab 112 comes to rest. The movement of the lift tab 112 is reversed in the case of loading the read/write head 110 onto the disk 106 (e.g., moving from the third point 324 towards the second point 322 and the first point 320 until the lift tab 112 moves off of the ramp 108).

As shown in FIG. 4B, two ramps 108 are depicted—one ramp 108 that corresponds to each side of the disk 106 for loading and unloading the lift tab 112 and the read/write head 110 from the corresponding side of the disk 106. In certain embodiments, a hard drive unit may include a plurality of these configurations in a stacked arrangement, as shown in FIG. 1.

For instance, in some embodiments, a magnetic storage device 100 may be hard drive that includes a plurality of disks 106. Each surface of a single disk 106 may be configured to store data. Accordingly, there may be at least two head gimbal assemblies 104 for each disk 106, one for each surface of the disk 106 for reading/writing data from/to the disk 106. In such an embodiment, a ramp 108 as described above with reference to FIGS. 3A-4B may correspond to each head gimbal assembly 104, and more specifically the corresponding lift tabs 112 of the head gimbal assemblies 104, to load and unload a read/write head 110 from each disk 106 as the head gimbal assemblies 104 are radially moved towards and away from the disks 106.

Figure 5:
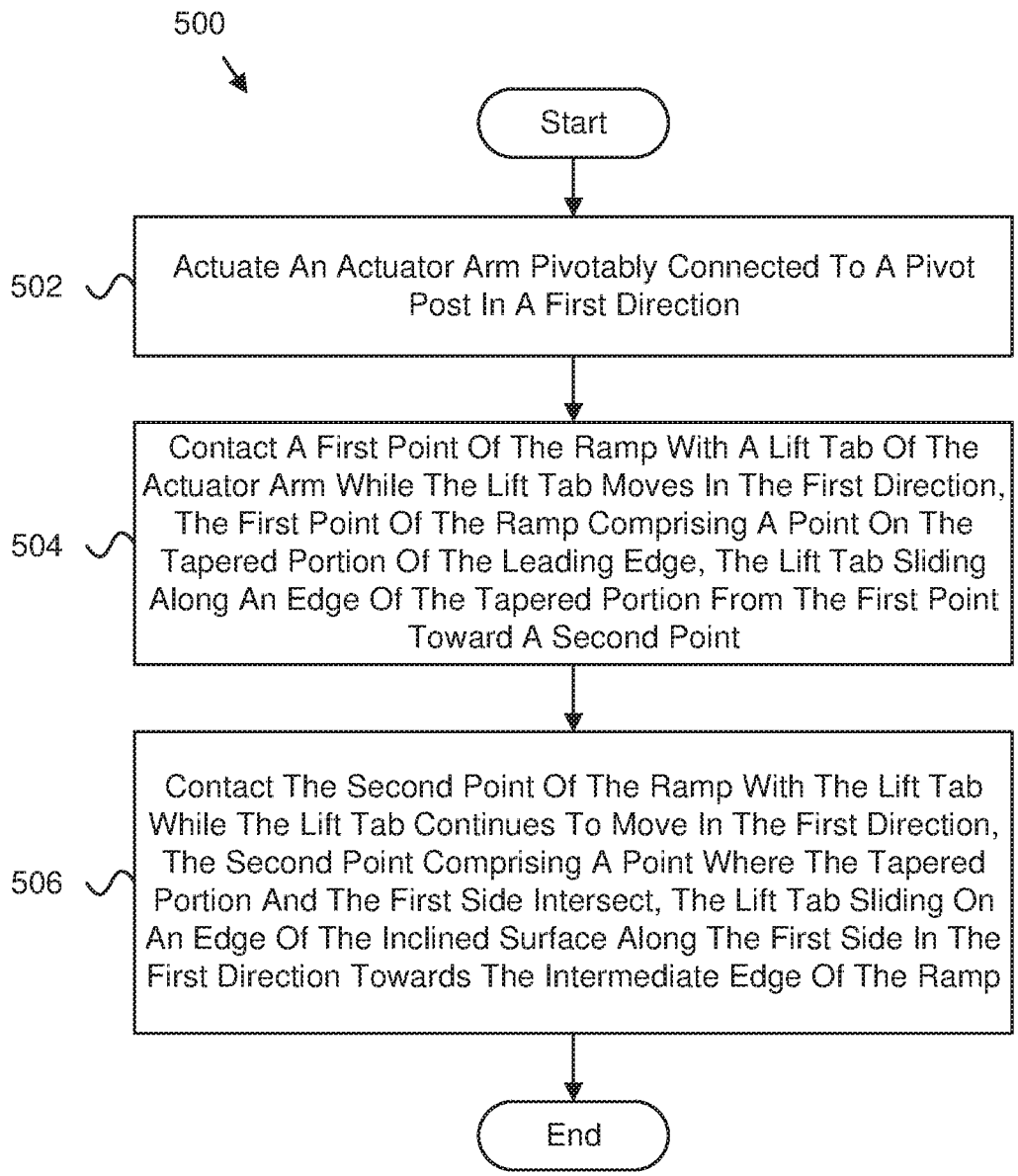
FIG. 5 is a schematic flow-chart diagram of a method of loading and unloading a read/write head from a disk using a ramp, according to one or more examples of the present disclosure.

FIG. 5 is a schematic flow-chart diagram illustrating one embodiment of a method 500 for loading and unloading a read/write head 110 from a disk 106 using a ramp 108. In one embodiment, the method 500 actuates 502 an actuator arm 116 pivotably connected to a pivot post 118 in a first direction 305. In further embodiments, the method 500 contacts 504 a first point 320 of the ramp 108 with a lift tab 112 of the actuator arm 116 while the lift tab 112 moves in the first direction 305, the first point 320 of the ramp 108 comprising a point on the tapered portion 306 of the leading edge 307, the lift tab 112 sliding along an edge of the tapered portion 306 from the first point 320 toward a second point 322.

In certain embodiments, the method 500 contacts 506 the second point 322 of the ramp 108 with the lift tab 112 while the lift tab 112 continues to move in the first direction 305, the second point 322 comprising a point where the tapered portion 306 and the first side 302 intersect, the lift tab 112 sliding on an edge of the inclined surface 308 along the first side 302 in the first direction 305 towards the intermediate edge 310 of the ramp 108, and the method 500 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A ramp for receiving a lift tab of a hard disk drive, the ramp comprising:
   a first side and a second side, the first side being spaced apart from the second side; and
   an inclined surface along which the lift tab slides as it moves in a first direction to remove a read/write head from a disk of the hard disk drive, wherein:
      the inclined surface inclines from a leading edge of the ramp to an intermediate edge of the ramp in the first direction;
      the inclined surface has a width that is generally perpendicular to the first direction and extends from the first side to the second side;
      the leading edge comprises a tapered portion that extends from the first side toward the second side of the ramp; and
      the tapered portion defines an oblique angle relative to the first direction.

2. The ramp of claim 1, wherein the tapered portion extends continuously from the first side to the second side.

3. The ramp of claim 1, wherein the tapered portion extends continuously from the first side to an intermediate point located between the first side and the second side.

4. The ramp of claim 1, wherein the oblique angle defined by the tapered portion relative to the first direction is less than 90 degrees.

5. The ramp of claim 4, wherein the oblique angle defined by the tapered portion relative to the first direction is within a range of 25-65 degrees.

6. The ramp of claim 5, wherein the oblique angle defined by the tapered portion relative to the first direction is 45 degrees.

7. The ramp of claim 1, wherein an angle of incline of the inclined surface is within a range of 16-20 degrees.

8. The ramp of claim 1, wherein the first side is shorter than the second side by a length within a range of 0.10-0.50 mm.

9. The ramp of claim 8, wherein the first side is shorter than the second side by a length of 0.30 mm.

10. A hard drive, comprising:
a plurality of disks;
a plurality of lift tabs, each lift tab comprising an elongate member that is coupled to an actuator arm of a plurality of actuator arms, each actuator arm pivotably connected to a pivot post and comprising a read/write head for reading and writing data from/to a corresponding disk of the plurality of disks when the actuator arm is in a load position; and
a ramp structure comprising a plurality of ramps, each ramp corresponding to a disk of the plurality of disks and comprising;
a first side and a second side, the first side being spaced apart from the second side; and
an inclined surface along which each lift tab slides as it moves in a first direction to remove the read/write head from a disk of the plurality of disks, wherein:
the inclined surface inclines from a leading edge of the ramp to an intermediate edge of the ramp in the first direction;
the inclined surface has a width, generally perpendicular to the first direction and extends from the first side to the second side;
the leading edge comprises a tapered portion that extends from the first side toward the second side of the ramp; and
the tapered portion defines an oblique angle relative to the first direction.

11. The hard drive of claim 10, wherein:
the lift tab, while moving in the first direction to remove the read/write head from the disk, contacts the ramp at a first point on the tapered portion and slides along an edge of the tapered portion of the leading edge to a second point where the tapered portion and the first side intersect; and
the lift tab slides on an edge of the inclined surface along the second side in the first direction towards the intermediate edge of the ramp.

12. The hard drive of claim 11, wherein the lift tab travels a radial distance within a range of 0.15-0.35 mm while sliding along the tapered portion of the ramp.

13. The hard drive of claim 12, wherein the lift tab travels a radial distance of 0.25 mm while sliding along the tapered portion of the ramp.

14. The hard drive of claim 11, wherein the lift tab slides a linear distance along the tapered portion of the ramp within a range of 0.75-1.00 mm.

15. The hard drive of claim 14, wherein the lift tab slides a linear distance along the tapered portion of the ramp of 0.88 mm.

16. The hard drive of claim 11, wherein an amount of radial distance that the lift tab travels and an amount of linear distance the lift tab slides along the tapered portion is determined as a function of the oblique angle defined by the tapered portion relative to the first direction.

17. The hard drive of claim 10, wherein the tapered portion of each ramp of the plurality of ramps that extends from the first side toward the second side of the ramp is tangential to an outer edge of a corresponding disk of the plurality of disks.

18. The hard drive of claim 10, wherein each ramp of the plurality of ramps is offset a distance from a corresponding disk of the plurality of disks such that the ramp does not overlap the disk.

19. A method of loading and unloading a read/write head from a disk using a ramp, the method comprising:
actuating an actuator arm pivotably connected to a pivot post in a first direction, wherein:
the actuator arm comprises the read/write head and a lift tab;
the read/write head is configured to read and write data from/to the disk when the actuator arm is in a load position;
the lift tab comprises an elongate member that is configured to engage the ramp to remove the read/write head from the disk while the actuator arm moves in the first direction;
the ramp comprises:
a first side and a second side, the first side being spaced apart from the second side; and
an inclined surface along which the lift tab slides as it moves in the first direction to remove the read/write head from the disk, the inclined surface inclining from a leading edge of the ramp to an intermediate edge of the ramp in the first direction and the inclined surface having a width, generally perpendicular to the first direction, extending from the first side to the second side; and
the leading edge comprises a tapered portion extending from the first side toward the second side of the ramp, the tapered portion defining an oblique angle relative to the first direction;
contacting a first point of the ramp with the lift tab while the lift tab moves in the first direction, the first point of the ramp comprising a point on the tapered portion of the leading edge, the lift tab sliding along an edge of the tapered portion from the first point toward a second point; and
contacting the second point of the ramp with the lift tab while the lift tab continues to move in the first direction, the second point comprising a point where the tapered portion and the first side intersect, the lift tab sliding on an edge of the inclined surface along the first side in the first direction towards the intermediate edge of the ramp.

20. The method of claim 19, further comprising:
actuating the actuator arm in a second direction opposite the first direction, to remove the lift tab from the ramp and load the read/write head onto the disk;
contacting the second point of the ramp with the lift tab while the lift tab moves in the second direction, the lift tab sliding on the edge of the inclined surface along the first side in the second direction towards the first point; and
contacting the first point of the ramp with the lift tab while the lift tab continues to move in the second direction, the lift tab sliding along the edge of the tapered portion from the second point toward the first point, the lift tab removed from the ramp at the first point.

\* \* \* \* \*